(12) United States Patent
Chang et al.

(10) Patent No.: US 7,354,618 B2
(45) Date of Patent: *Apr. 8, 2008

(54) OXYGEN PLASMA POST-DEPOSITION TREATMENT OF MAGNETIC RECORDING MEDIA

(75) Inventors: Chung-Hee Chang, Fremont, CA (US); Xiaoding Ma, Fremont, CA (US); Michael Joseph Stirniman, Fremont, CA (US); Jeffrey Shane Reiter, Palo Alto, CA (US); Samuel Dacke Harkness, IV, Berkeley, CA (US); Rajiv Ranjan, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 268 days.

This patent is subject to a terminal disclaimer.

(21) Appl. No.: 10/704,593

(22) Filed: Nov. 12, 2003

(65) Prior Publication Data
US 2005/0100664 A1    May 12, 2005

(51) Int. Cl.
*B05D 5/12* (2006.01)
(52) U.S. Cl. .................. 427/128; 427/128; 427/130; 427/131; 427/132
(58) Field of Classification Search ............... 427/127, 427/128, 130, 131, 132
See application file for complete search history.

(56) References Cited

U.S. PATENT DOCUMENTS

| | | | |
|---|---|---|---|
| 5,019,210 A * | 5/1991 | Chou et al. | 427/307 |
| 6,497,799 B1 * | 12/2002 | McLeod | 204/192.2 |
| 6,708,385 B1 * | 3/2004 | Lemelson | 29/563 |
| 7,081,268 B2 * | 7/2006 | Chang et al. | 427/128 |
| 2001/0010204 A1 * | 8/2001 | Takeyama et al. | 118/50 |
| 2002/0061421 A1 * | 5/2002 | Dieny | 428/692 |
| 2002/0160232 A1 * | 10/2002 | Shimizu et al. | 428/694 TM |
| 2003/0053269 A1 * | 3/2003 | Nishiyama | 360/324.1 |

* cited by examiner

*Primary Examiner*—Alain L. Bashore
(74) *Attorney, Agent, or Firm*—McDermott Will & Emery LLP

(57) ABSTRACT

A method of manufacturing magnetic recording media, comprising sequential steps of:
(a) providing an apparatus for manufacturing the media;
(b) supplying the apparatus with at least one substrate for the media;
(c) forming a magnetic recording layer on the at least one substrate in a first portion of the apparatus, the magnetic recording layer including a surface;
(d) treating the surface of the magnetic recording layer with an ionized oxygen-containing plasma in a second portion of the apparatus to form a plasma oxidized surface layer; and
(e) forming a protective overcoat layer on the plasma oxidized surface layer of the magnetic recording layer in a third portion of the apparatus.

20 Claims, 2 Drawing Sheets

OXYGEN PLASMA POST-DEPOSITION TREATMENT OF MAGNETIC RECORDING MEDIA

CROSS-REFERENCE TO RELATED APPLICATIONS

This application contains subject matter related to subject matter disclosed in co-pending, commonly assigned U.S. patent applications Ser. No. 10/663,698, filed on Sep. 17, 2003; Ser. No. 10/704,746, filed on Nov. 12, 2003; and Ser. No. 10/701,418, filed on Nov. 6, 2003.

FIELD OF THE INVENTION

The present invention relates to a method for improving the performance characteristics of high areal recording density magnetic recording media, and to media obtained thereby. The invention has particular utility in the manufacture of high areal recording density perpendicular media, e.g., hard disks, utilizing granular-type magnetic recording layers.

BACKGROUND OF THE INVENTION

Magnetic media are widely used in various applications, particularly in the computer industry, and efforts are continually made with the aim of increasing the areal recording density, i.e., bit density of the magnetic media. In this regard, so-called "perpendicular" recording media have been found to be superior to the more conventional "longitudinal" media in achieving very high bit densities. In perpendicular magnetic recording media, residual magnetization is formed in a direction perpendicular to the surface of the magnetic medium, typically a layer of a magnetic material on a suitable substrate. Very high linear recording densities are obtainable by utilizing a "single-pole" magnetic transducer or "head" with such perpendicular magnetic media.

Efficient, high bit density recording utilizing a perpendicular magnetic medium requires interposition of a relatively thick (as compared with the magnetic recording layer), magnetically "soft" underlayer ("SUL") layer, i.e., a magnetic layer having a relatively low coercivity of about 1 kOe or below, such as of a NiFe alloy (Permalloy), between the non-magnetic substrate, e.g., of glass, aluminum (Al) or an Al-based alloy, and the magnetically "hard" recording layer having relatively high coercivity of several kOe, typically about 3-6 kOe, e.g., of a cobalt-based alloy (e.g., a Co—Cr alloy such as CoCrPtB) having perpendicular anisotropy. The magnetically soft underlayer serves to guide magnetic flux emanating from the head through the hard, perpendicular magnetic recording layer.

A typical conventional perpendicular recording system 10 utilizing a vertically oriented magnetic medium 1 with a relatively thick soft magnetic underlayer, a relatively thin hard magnetic recording layer, and a single-pole head, is illustrated in FIG. 1, wherein reference numerals 2, 2A, 3, 4, and 5, respectively, indicate a non-magnetic substrate, an adhesion layer (optional), a soft magnetic underlayer, at least one non-magnetic interlayer, and at least one perpendicular hard magnetic recording layer. Reference numerals 7 and 8, respectively, indicate the single and auxiliary poles of a single-pole magnetic transducer head 6. The relatively thin interlayer 4 (also referred to as an "intermediate" layer), comprised of one or more layers of non-magnetic materials, serves to (1) prevent magnetic interaction between the soft underlayer 3 and the at least one hard recording layer 5 and (2) promote desired microstructural and magnetic properties of the at least one hard recording layer.

As shown by the arrows in the figure indicating the path of the magnetic flux $\phi$, flux $\phi$ is seen as emanating from single pole 7 of single-pole magnetic transducer head 6, entering and passing through the at least one vertically oriented, hard magnetic recording layer 5 in the region below single pole 7, entering and traveling along soft magnetic underlayer 3 for a distance, and then exiting therefrom and passing through the at least one perpendicular hard magnetic recording layer 5 in the region below auxiliary pole 8 of single-pole magnetic transducer head 6. The direction of movement of perpendicular magnetic medium 1 past transducer head 6 is indicated in the figure by the arrow above medium 1.

With continued reference to FIG. 1, vertical lines 9 indicate grain boundaries of polycrystalline layers 4 and 5 of the layer stack constituting medium 1. Since magnetically hard main recording layer 5 is epitaxially formed on interlayer 4, the grains of each polycrystalline layer are of substantially the same width (as measured in a horizontal direction) and in vertical registry (i.e., vertically "correlated" or aligned).

Completing the layer stack is a protective overcoat layer 11, such as of a diamond-like carbon (DLC), formed over hard magnetic layer 5, and a lubricant topcoat layer 12, such as of a perfluoropolyethylene material, formed over the protective overcoat layer.

Substrate 2 is typically disk-shaped and comprised of a non-magnetic metal or alloy, e.g., Al or an Al-based alloy, such as Al—Mg having an Ni—P plating layer on the deposition surface thereof, or substrate 2 is comprised of a suitable glass, ceramic, glass-ceramic, polymeric material, or a composite or laminate of these materials; optional adhesion layer 2A, if present, may comprise an up to about 30 Å thick layer of a material such as Ti or a Ti alloy; soft magnetic underlayer 3 is typically comprised of an about 500 to about 4,000 Å thick layer of a soft magnetic material selected from the group consisting of Ni, NiFe (Permalloy), Co, CoZr, CoZrCr, CoZrNb, CoFeZrNb, CoFe, Fe, FeN, FeSiAl, FeSiAlN, FeCoB, FeCoC, etc.; interlayer 4 typically comprises an up to about 300 Å thick layer or layers of non-magnetic material(s), such as Ru, TiCr, Ru/CoCr$_{37}$Pt$_6$, RuCr/CoCrPt, etc.; and the at least one hard magnetic layer 5 is typically comprised of an about 100 to about 250 Å thick layer(s) of Co-based alloy(s) including one or more elements selected from the group consisting of Cr, Fe, Ta, Ni, Mo, Pt, V, Nb, Ge, B, and Pd, iron nitrides or oxides, or a (CoX/Pd or Pt)$_n$ multilayer magnetic superlattice structure, where n is an integer from about 10 to about 25, each of the alternating, thin layers of Co-based magnetic alloy is from about 2 to about 3.5 Å thick, X is an element selected from the group consisting of Cr, Ta, B, Mo, Pt, W, and Fe, and each of the alternating thin, non-magnetic layers of Pd or Pt is up to about 10 Å thick. Each type of hard magnetic recording layer material has perpendicular anisotropy arising from magneto-crystalline anisotropy ($1^{st}$ type) and/or interfacial anisotropy ($2^{nd}$ type).

Another currently employed way of classifying perpendicular magnetic recording media is on the basis by which the magnetic grains are mutually separated, i.e., segregated, in order to physically de-couple the grains and provide improved media performance characteristics. Thus, magnetic media with Co-based alloy perpendicular magnetic recording layers (e.g., CoCr alloys) are typically classified into two distinct types: (1) a first type, wherein segregation of the grains occurs by diffusion of Cr atoms of the magnetic layer to the grain boundaries of the layer to form Cr-rich grain boundaries, which diffusion process requires heating of the media substrate during formation (deposition) of the magnetic layer; and (2) a second type, wherein segregation of the grains occurs by formation of oxides and/or nitrides at the boundaries between adjacent magnetic grains to form so-called "granular" media, which oxides and/or nitrides may be formed by introducing a minor amount of at least one reactive gas, i.e., oxygen ($O_2$) and/or nitrogen ($N_2$) to the inert gas (e.g., Ar) atmosphere during sputter deposition of the Co alloy-based perpendicular magnetic layer. Generally, substrate heating is not required during such reactive sputtering deposition of the magnetic layer.

Perpendicular magnetic recording media may be fabricated according to a procedure wherein a media substrate with a stack of layers formed thereon, including a just-formed, i.e., topmost, perpendicular magnetic recording layer, is removed from the manufacturing apparatus, e.g., a sputtering apparatus, for exposure to the ambient atmosphere in order to form a surface oxide layer on the magnetic recording layer prior to deposition of a protective overcoat layer thereon, e.g., a carbon (C)-based layer, such as diamond-like carbon (DLC). Typically, the sputtering apparatus constitutes one chamber of an in-line or circularly-configured multi-chamber or similar type apparatus, for use in performing large-scale, automated, continuous manufacture of magnetic recording media. However, removal of the media precursor from the multi-chamber sputtering apparatus for performing the surface oxidation treatment by exposure of the media precursor to the ambient atmosphere prior to the carbon deposition step severely impacts the efficiency and manufacturing throughput of the apparatus. Specifically, additional air locks, loading and unloading means, etc., are required for removing media precursors from a continuous manufacturing apparatus in order to perform the ambient oxidation treatment and then supplying the surface-oxidized media precursors to another manufacturing apparatus (or returning them to the previously utilized multi-chamber apparatus) for subsequent processing, e.g., protective overcoat formation. In addition, the removal of the media precursors from the manufacturing apparatus and the surface oxidation treatment via exposure to the ambient atmosphere disadvantageously incur an excessive increase in the overall media manufacturing interval, cost, and efficiency.

Co-pending, commonly assigned U.S. patent application Ser. No. 10/663,698, filed on Sep. 17, 2003 discloses a method for performing surface oxidation of media precursors in a continuous manner by utilizing a manufacturing apparatus comprising a dedicated oxidation treatment chamber or station positioned between the consecutively arranged chambers or stations for sequential deposition of the magnetic recording layer and the protective overcoat layer. According to the invention disclosed therein, the dedicated oxidation chamber or station is supplied with oxygen gas (admixed with an inert carrier gas) at a sub-atmospheric pressure and at ambient (i.e., room) temperature, such that oxidation of the surface of the magnetic recording layer occurs during the interval in which the media precursor transits the chamber at a transport rate consistent with the transport rate through the other processing chambers or stations of the manufacturing apparatus.

Co-pending, commonly assigned U.S. patent application Ser. No. 10/704,746, filed on Nov. 12. 2003 discloses another method for performing surface oxidation of media precursors in a continuous manner, by utilizing a manufacturing apparatus comprising a dedicated thermally assisted oxidation treatment chamber or station positioned between the consecutively arranged chambers or stations for sequential deposition of the magnetic recording layer and the protective overcoat layer. According to the invention disclosed therein, the dedicated thermally assisted oxidation chamber or station is supplied with oxygen gas and includes heating means for maintaining the media precursors at an elevated temperature during treatment therein, such that oxidation of the surface of the magnetic recording layer is facilitated during the treatment interval in which the media precursor transits the chamber at a transport rate consistent with the transport rate through the other processing chambers or stations of the manufacturing apparatus.

However, it is considered that neither of the above-described methods for performing post-deposition oxidation treatment of media precursors in dedicated oxidation chambers or stations will be universally effective, i.e., capable of achieving sufficient or complete surface oxidation of the magnetic recording layer of the media precursor in the treatment interval during which the precursor transits the oxidation chamber or station, irrespective of the nature or composition of the magnetic recording layer. Specifically, the effect of insufficient or incomplete surface oxidation is expected to be greatest with media precursors comprising magnetic recording layers containing one or more difficult-to-oxidize alloying elements, e.g., noble and/or refractory elements.

In view of the foregoing, there exists a clear need for means and methodology for manufacturing improved, high areal recording density, high performance magnetic recording media, which means and methodology avoid the disadvantages and drawbacks associated with the above-described means and methodology, and which facilitate high throughput, cost-effective, automated manufacture of high performance magnetic recording media, e.g., perpendicular media.

The present invention, therefore, addresses and solves the above-described problems, drawbacks, and disadvantages relating to the inadequate or incomplete surface oxidation associated with the above-described means and methodology for the manufacture of high performance magnetic recording media, particularly perpendicular media, while maintaining full compatibility with all aspects of automated magnetic media manufacture.

DISCLOSURE OF THE INVENTION

An advantage of the present invention is an improved method of manufacturing magnetic recording media.

Another advantage of the present invention is an improved method of manufacturing perpendicular magnetic recording media.

Still another advantage of the present invention is an improved method of manufacturing magnetic recording media according to a continuous fabrication process.

Yet another advantage of the present invention is an improved method of manufacturing perpendicular magnetic recording media according to a continuous fabrication process.

A further advantage of the present invention is improved perpendicular magnetic recording media fabricated according to the inventive methodology.

Additional advantages and other features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by a method of manufacturing magnetic recording media, comprising sequential steps of:

(a) providing an apparatus for manufacturing the media;

(b) supplying the apparatus with at least one substrate for the media;

(c) forming a magnetic recording layer on the at least one substrate in a first portion of the apparatus, the magnetic recording layer including a surface;

(d) treating the surface of the magnetic recording layer with an ionized oxygen-containing plasma in a second portion of the apparatus to form a plasma oxidized surface layer; and (e) forming a protective overcoat layer on the plasma oxidized surface layer of the magnetic recording layer in a third portion of the apparatus.

According to preferred embodiments of the present invention, step (a) comprises providing a linearly or circularly-configured apparatus including at least said first, second, and third spaced-apart portions; the apparatus is adapted for continuous manufacture of a plurality of the media, and includes means for transporting the at least one substrate serially through the first, second, and third spaced-apart portions, the first, second, and third spaced-apart portions comprising respective first, second, and third spaced-apart chambers; the second chamber comprising means for contacting the surface of the magnetic recording layer formed on the at least one substrate in step (c) with the ionized oxygen-containing plasma, the second chamber comprising at least one plasma source for generating the ionized oxygen-containing plasma, selected from the group consisting of: an ion source, a substrate bias voltage source, an inductively coupled RF or DC source, a capacitively coupled RF or DC source, and a radiation source; and the first and third chambers each comprise means for performing therein a thin film deposition process on the at least one substrate, the first and third chambers comprising means for performing a respective sputter deposition process therein.

In accordance with preferred embodiments of the present invention, step (b) comprises supplying the apparatus with at least one disk-shaped non-magnetic substrate for a hard disk magnetic recording medium; step (c) comprises forming a perpendicular magnetic recording layer, e.g., a Cr-segregated, Cr-rich grain boundary, Co-based alloy perpendicular magnetic recording layer or a granular Co-based alloy perpendicular magnetic recording layer; step (d) comprises supplying oxygen ($O_2$) gas to the second portion of the apparatus for forming the ionized oxygen-containing plasma therein; and step (e) comprises forming a carbon (C)-based protective overcoat on the plasma oxidized surface layer on the magnetic recording layer, e.g., by sputter deposition.

Particular embodiments of the present invention include those wherein step (c) comprises forming a Cr-segregated, Cr-rich grain boundary, Co-based alloy perpendicular magnetic recording layer comprised of a CoCrPtX alloy, where X=at least one element selected from the group consisting of Ta, B, Mo, V, Nb, W, Zr, Re, Cu, Ag, Hf, Ir, and Y, and wherein Co-containing magnetic grains with hcp lattice structure are segregated by Cr-rich grain boundaries; and those wherein step (c) comprises forming a granular Co-based alloy perpendicular magnetic recording layer comprised of a CoPtX alloy, where X=at least one element or material selected from the group consisting of Cr, Ta, B, Mo, V, Nb, W, Zr, Re, Ru, Cu, Ag, Hf, Ir, Y, $SiO_2$, SiO, $Si_3N_4$, $Al_2O_3$, AlN, TiO, $TiO_2$, $TiO_x$, TiN, TiC, $Ta_2O_3$, NiO, and CoO, and wherein Co-containing magnetic grains with hcp lattice structure are segregated by grain boundaries comprising at least one of oxides, nitrides, and carbides.

Another aspect of the present invention is a method of manufacturing magnetic recording media according to a continuous fabrication process, comprising sequential steps of:

(a) providing at least one substrate for the magnetic recording media;

(b) providing an apparatus adapted for continuous manufacturing of the magnetic recording media, comprising at least first, second, and third spaced-apart, serially arranged processing chambers and including means for transporting the at least one substrate serially through at least the first, second, and third spaced-apart processing chambers;

(c) transporting the at least one substrate through the first processing chamber while forming a magnetic recording layer thereon, the magnetic recording layer having a surface;

(d) transporting the at least one substrate with the magnetic recording layer formed thereon to the second processing chamber;

(e) transporting the at least one substrate through the second processing chamber while treating the surface of the magnetic recording layer with an ionized oxygen-containing plasma to form a plasma oxidized surface layer;

(f) transporting the at least one substrate with the plasma oxidized surface layer on the magnetic recording layer to the third processing chamber; and (g) transporting the at least one substrate with the plasma oxidized surface layer on the magnetic recording layer through the third processing chamber while forming a protective overcoat layer thereon, wherein:

the at least one substrate is transported between and through each of the first, second, and third processing chambers at a substantially constant rate.

According to preferred embodiments of the present invention, step (a) comprises providing at least one disk-shaped non-magnetic substrate for hard disk recording media; step (b) comprises providing an apparatus wherein the first and third chambers comprise means for performing a thin film deposition process therein and the second chamber comprises means for contacting the surface of the magnetic recording layer formed in step (c) with an ionized oxygen-containing plasma; and step (c) comprises forming a Cr-segregated, Cr-rich grain boundary, Co-based alloy perpendicular magnetic recording layer or a granular Co-based alloy perpendicular magnetic recording layer.

A further aspect of the present invention is perpendicular magnetic recording media fabricated according to the inventive methodology.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, wherein.

DESCRIPTION OF THE INVENTION

Figure 1:
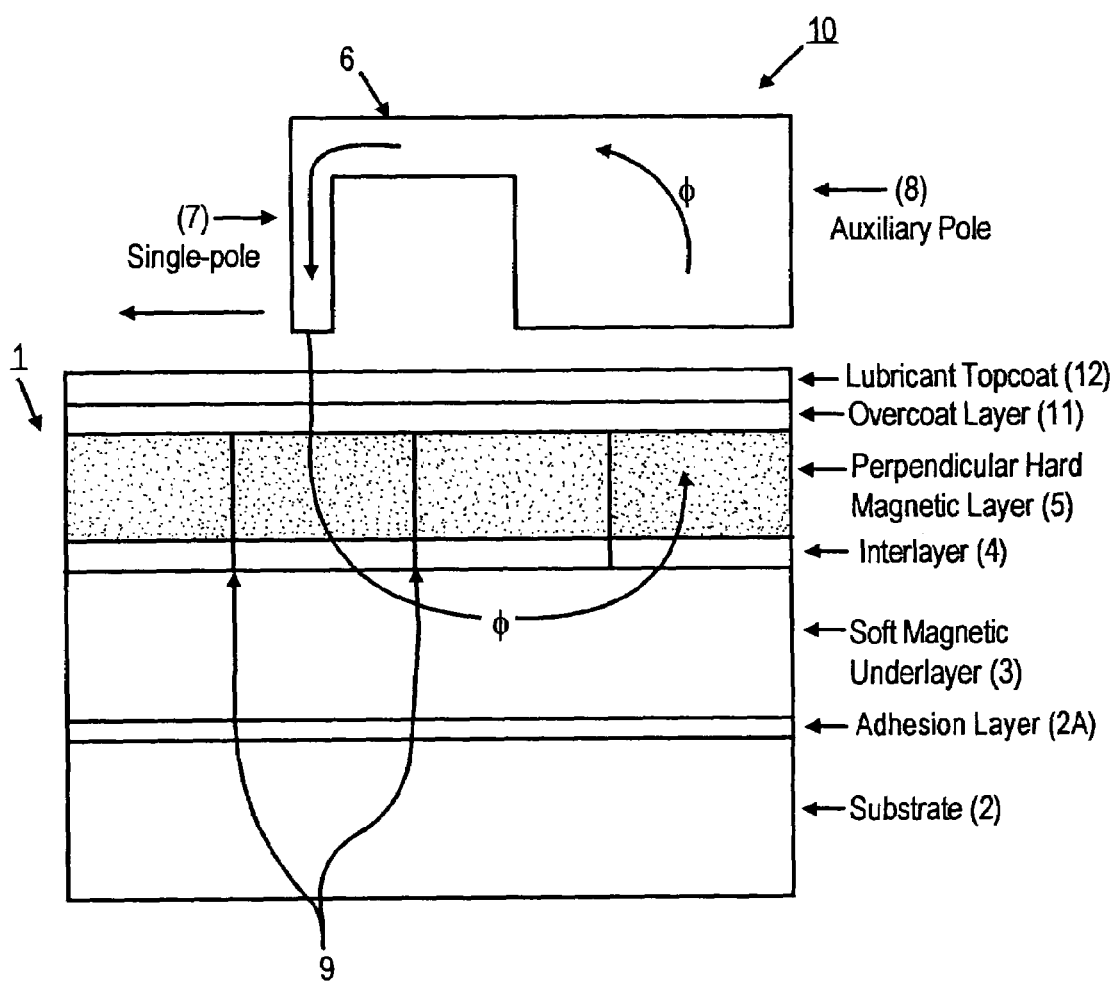
FIG. 1 schematically illustrates, in simplified cross-sectional view, a portion of a magnetic recording storage, and retrieval system comprised of a perpendicular magnetic recording medium and a single pole transducer head.

The present invention addresses and solves product throughput and manufacturing cost-effectiveness problems, as well as concerns relating to incomplete surface oxidation associated with various processing techniques for the manufacture of high areal recording density, high performance magnetic recording media, particularly perpendicular magnetic recording media. The present invention advantageously facilitates high product throughput, continuous, automated manufacture of hard disks, while maintaining full compatibility with all aspects and requirements of such automated manufacturing technology for magnetic media manufacture.

Specifically, the present invention addresses and solves problems and drawbacks associated with the requirement that the media precursor, i.e., a media substrate with a stack of layers formed thereon, including a topmost magnetic recording layer, specifically a perpendicular recording layer, be subjected to treatment immediately after its deposition on a media substrate, but prior to formation thereon of a protective overcoat layer, to form an oxide layer on the surface thereof. According to one approach (described supra), the media precursor with the just-formed magnetic recording layer is removed from the manufacturing apparatus, e.g., a sputtering apparatus, for exposure to the ambient (i.e., room temperature) atmosphere in order to form the oxide layer on the surface of the magnetic recording layer prior to formation (i.e., deposition) of the protective overcoat layer thereon, e.g., a carbon (C)-based layer, such as diamond-like carbon (DLC) formed by a sputtering process.

According to more recent approaches, as for example disclosed in the aforementioned co-pending, commonly assigned U.S. patent applications Ser. No. 10/663,698, filed on Sep. 17, 2003; Ser. No. 10/704,746, filed on Nov. 12, 2003; and Ser. No. 10/701,418, filed on Nov. 6, 2003, the media precursor with the just-formed magnetic recording layer thereon is not removed from the manufacturing apparatus for formation of the surface oxide layer in the ambient atmosphere, but rather is transported, within the continuous manufacturing apparatus, to a dedicated in situ post-deposition surface oxidation chamber or station intermediate the pair of chambers or stations utilized for formation of the magnetic recording and protective overcoat layers, whereby the advantages of continuous, automated manufacture are retained. As described supra, according to the invention disclosed in application Ser. No. 10/663,698, the surface oxide layer is formed in the dedicated in situ post-deposition surface oxidation chamber or station by supplying oxygen gas (admixed with an inert gas) to the chamber at a sub-atmospheric pressure and at ambient (i.e., room temperature); whereas, according to the invention disclosed in application Ser. No. 10/704,746, the dedicated in situ post-deposition surface oxidation chamber or station supplied with oxygen gas includes heating means for maintaining the media precursors at an elevated temperature during the oxidation treatment, whereby surface oxidation of the magnetic recording layer is facilitated vis-á-vis a situation wherein surface oxidation occurs at sub- atmospheric pressure and at an elevated temperature. According to the invention disclosed in application Ser. No. 10/701,418, the dedicated in situ post-deposition surface oxidation chamber or station is supplied with a plasma containing at least one ionized oxygen species derived from a source gas comprised of a compound of oxygen and at least one other non-metallic element.

As previously indicated, the sputtering apparatus utilized for the formation of the magnetic recording and protective overcoat layers typically forms part of an in-line or circularly-configured multi-chamber or similar type apparatus utilized for large-scale, automated, continuous manufacture of magnetic recording media. However, removal of the media precursor from the multi-chamber sputtering apparatus for performing the surface oxidation treatment according to the above-described practice, by exposure of the media precursors to the ambient atmosphere prior to the protective overcoat deposition step, severely impacts the efficiency and product throughput of the apparatus. According to such methodology, additional air locks, loading and unloading means, etc., are required for removing media precursors from a continuous manufacturing apparatus in order to perform the ambient oxidation treatment and for supplying the surface-oxidized media precursors to another manufacturing apparatus (or returning them to the previously utilized multi-chamber apparatus) for subsequent processing, e.g., protective overcoat formation. In addition, the removal of the media precursors from the manufacturing apparatus and the surface oxidation treatment via exposure to the ambient atmosphere disadvantageously incur an excessive increase in the overall media manufacturing interval, cost, and efficiency.

In addition, neither of the above-described approaches involving dedicated in situ post-deposition oxidation treatment chambers or stations is considered to be universally effective, i.e., capable of achieving sufficient or complete surface oxidation of the magnetic recording layer of the media precursor in the treatment interval during which the precursor transits the oxidation chamber or station, irrespective of the nature or composition of the magnetic recording layer. Specifically, the effect of insufficient or incomplete surface oxidation is expected to be greatest with media precursors comprising magnetic recording layers containing one or more difficult-to-oxidize alloying elements, e.g., noble and/or refractory elements.

The present invention, therefore, is based upon recognition by the inventors that the requisite oxidation treatment of the surfaces of perpendicular magnetic recording layers of media precursors can be satisfactorily performed in rapid, efficient, and cost-effective manner, by means of an in situ post-deposition plasma oxidation process utilizing a manufacturing apparatus comprising a dedicated in situ plasma oxidation portion or station intermediate a pair of spaced-apart thin film deposition portions or stations for respectively forming the perpendicular magnetic recording and protective overcoat layers. As a consequence of the plasma oxidation process afforded by the invention, the previous requirement for removal of the media precursors from the magnetic layer deposition station (e.g., a sputter deposition chamber) for exposure of the just-formed perpendicular magnetic layer to the ambient atmosphere for surface oxidation, prior to formation thereon of the protective overcoat layer at another deposition station is eliminated. In addition, because the ionized oxygen species formed in the plasma treatment chamber or station are substantially more reactive than the neutral oxygen species present in either of the aforementioned cases where a dedicated in situ post-deposition oxidation treatment chamber is provided intermediate the magnetic recording layer and protective overcoat layer deposition chambers, the inventive plasma oxidation process will be more effective, and shorter intervals for the surface oxidation treatment of the magnetic recording layer in the dedicated in situ post-deposition plasma oxidation chamber will be necessary for obtaining a sufficient amount of surface oxidation. As a consequence of the use of a plasma comprising ionized oxygen for performing the surface oxidation, the required interval for the media precursors to be present in the in situ post-deposition oxidation treatment chamber for obtaining a sufficient amount or degree of oxidation of the surface of the magnetic recording layer will be substantially reduced, relative to the prior techniques, and thus will not limit the rate at which media substrates may be transported from chamber-to-chamber in the automated manufacturing apparatus, thereby resulting in increased product throughput, hence enhanced cost-effectiveness of the manufacturing process.

According to the invention, therefore, the disadvantages and drawbacks associated with methodology involving removal of the media precursor substrates from the manufacturing apparatus, the relatively long interval for surface oxidation of the magnetic recording layer in the ambient (i.e., room temperature) atmosphere, and return of the surface-oxidized media precursors to the previously employed manufacturing apparatus or to another manufacturing apparatus for further processing/treatment (e.g., for protective overcoat formation) are effectively avoided while product throughput rates are increased. In addition, the present invention obviates any problems of insufficient surface oxidation and product throughput limitations associated with the above-described approaches involving dedicated in situ post-deposition oxidation treatment chambers.

Figure 2:
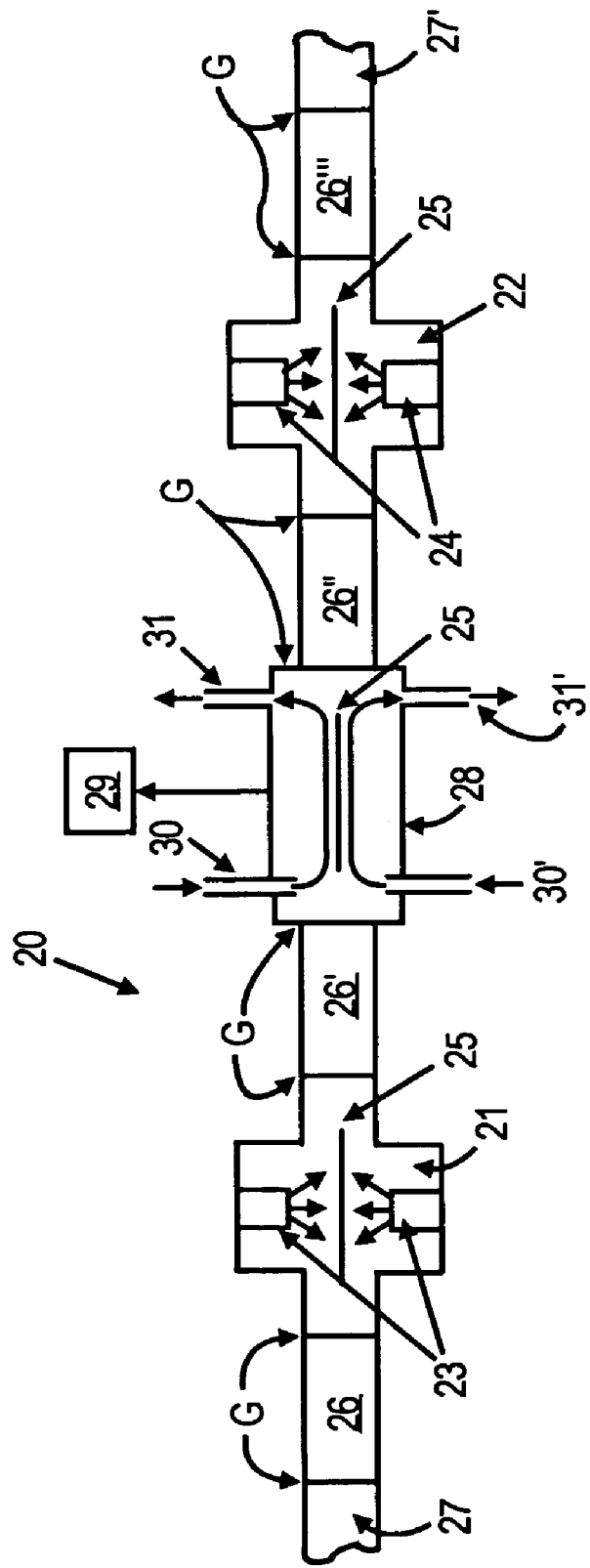
FIG. 2 schematically illustrates, in simplified plan view, a portion of an in-line apparatus for continuous manufacture of magnetic recording media according to an embodiment of the present invention.

Referring now to FIG. 2, schematically illustrated therein, in simplified plan view, is a portion of an in-line apparatus 20 for continuous manufacture of magnetic recording media according to an embodiment of the present invention. As illustrated, apparatus 20 comprises a series of linearly arranged process chambers interconnected by respective buffer/isolation chambers 26, etc., each equipped with gate means G. Specifically, apparatus 20 includes first and second spaced-apart thin film deposition chambers or stations 21 and 22, illustratively sputter deposition chambers or stations, each including at least one, preferably a pair of spaced-apart, facing sputter sources 23 or 24, for performing deposition of a thin film on at least one surface of substrates 25, preferably simultaneous thin film deposition on both sides of dual-sided substrates 25. Apparatus 20 further comprises pairs of buffer/isolation chambers, such as 26, 26' and 26'', 26''', at opposite laterally spaced ends of respective deposition chambers or stations 21 and 22 for insertion and withdrawal, respectively, of a plurality of substrates 25, e.g., disk-shaped substrates for hard disk recording media carried and transported through each station and from chamber-to-chamber by a corresponding plurality of substrate mounting/transport means (not shown in the figure for illustrative simplicity). In operation of apparatus 20, each of the opposing surfaces of the dual-surfaced substrates 25 faces a respective sputter source 23 or 24 during "pass-by" transport and treatment/processing in the apparatus. Chambers 27, 27' respectively connected to the distal ends of inlet and outlet buffer/isolation chambers 26 and 26''', respectively, are provided for utilizing apparatus 20 as part of a larger, continuously operating, in-line apparatus wherein the substrates 25 receive deposition or other treatment antecedent and/or subsequent to processing in the apparatus portion illustrated in FIG. 2.

According to the invention, a third station or chamber 28, i.e., a plasma oxidation chamber, is positioned intermediate the first and second spaced-apart sputter deposition chambers or stations 21 and 22 and operatively connected thereto by means of buffer/isolation chambers 26' and 26'' (and associated gate means G) at the respective inlet and outlet ends thereof. As illustrated, chamber 28 is adapted for performing oxygen plasma treatment (i.e., oxidation) of opposing surfaces of dual-sided substrates 25, and includes opposing pairs of gas inlets 30, 30' and outlets 31, 31' for flowing an ionized oxygen-containing plasma gas past the opposing surfaces of substrates 25. Chamber 28 further comprises at least one plasma source means 29 of conventional type, adapted for generating a plasma comprising ionized oxygen, either prior or subsequent to entry of $O_2$ or $O_2$+inert carrier gas into chamber 28 via inlets 30, 30', which at least one plasma source means 29 is selected from the group consisting of: an ion source, a substrate bias voltage source, an inductively coupled RF or DC source, a capacitively coupled RF or DC source, and a radiation source (e.g., a UV source).

In operation of apparatus 20, substrates 25, typically dual-sided, annular disk-shaped substrates (such as substrate 2 of FIG. 1, described in detail supra) for hard disk magnetic recording media, enter the illustrated portion of apparatus 20 at inlet chamber 27 after receiving antecedent processing in a plurality of downstream processing chambers or stations (not shown in the drawing for illustrative simplicity), for deposition of an adhesion layer, a soft magnetic underlayer, and at least one non-magnetic interlayer (corresponding to the layers respectively identified by reference numerals 2A, 3, and 4 in FIG. 1 and described in detail supra), typically on both surfaces thereof, and are transported to the first sputter deposition chamber or station 21, wherein a Magnetic recording layer, e.g., a perpendicular hard magnetic recording layer (corresponding to layer 5 in FIG. 1), such as, for example, a Co-based alloy Cr segregation-type magnetic layer or a Co-based alloy granular-type magnetic layer (each as described in detail supra), is formed on the non-magnetic interlayer(s) 4 by an appropriate sputter eposition process (i.e., with substrate heating when forming a Cr segregation-type magnetic layer 5 and by reactive sputtering, without substrate heating, in an $O_2$ and/or $N_2$ containing atmosphere when forming a granular-type magnetic layer 5).

Following deposition of a selected perpendicular hard magnetic recording layer 5 of appropriate thickness on the surface(s) of the precursor substrates 25 in the first sputter deposition chamber or station 21, the substrates are transported, via buffer/isolation chamber 26' and associated gates G, to chamber 28 for performing a thermal oxidation of the surface of the perpendicular hard magnetic recording layer(s) 5. According to the invention, a plasma comprising at least one ionized oxygen species, derived from $O_2$ gas or $O_2$ gas in admixture with at least one inert gas, e.g., Ar, Kr, or Xe, is flowed past the surface(s) of the substrates/workpieces 25 via inlet conduits 30, 30' and outlet conduits 31, 31' located on opposite side walls of chamber 28. Typical pressures within plasma treatment chamber 28, whether the plasma is derived from pure $O_2$ gas or $O_2$ gas+at least one inert gas, range from about 2 to about 40 mTorr, preferably about 2-15 mTorr, flow rates of the plasma gas range from about 2 to about 100 sccm, preferably about 2-40 sccm, and the power supplied by plasma generating source 29 typically ranges from about 100 to about 3,000 W, preferably about 200-500 W. The combination of plasma gas pressure and flow rate, and plasma generating power supplied to chamber 28 is selected to provide formation of a surface oxide layer of desired thickness, e.g., from about 3 to about 20 Å, preferably about 5-10 Å, at a continuous transport rate of the substrates/workpieces 25 through chamber 28, which transport rate determines the residence time, or treatment interval, of substrates/workpieces 25 transported through chamber 28). In contrast with the above-described instances wherein the manufacturing apparatus comprises a dedicated in situ post-deposition oxidation chamber operating at ambient or elevated temperature and the transport rate through the apparatus is limited by the interval required for achieving satisfactory oxidation treatment of the magnetic recording layer, the substrate transport rates according to the present are at least equal to the typical continuous transport rates of substrates 25 through the various chambers or stations of apparatus 20 in the absence of oxidation chamber 28. The enhanced substrate transport rates afforded by the invention derive from the increased effectiveness of the plasma oxidation process vis-á-vis the non-plasma oxidation processes, and typically are in the range from about 1 to about 40 ft./min., preferably about 5-15 ft./min.

Following formation of the surface oxide layer(s) on the magnetic recording layer(s) in chamber 28, the substrates 25 are transported, via buffer/isolation chamber 26" and associated gates G, to the second sputter deposition chamber or station 22, where a protective overcoat layer (corresponding to the layer identified by reference numeral 11 in FIG. 1 and described in detail supra) is formed over the plasma-oxidized perpendicular hard magnetic recording layer(s) 5, as by sputtering of a carbon (C)-based layer, e.g., diamond-like carbon (DLC). The thus-processed substrates 25 are then transported, via outlet buffer/isolation chamber 26''' and associated gates G, to chamber 27', for withdrawal from apparatus 20 or for further processing therein, e.g., for deposition thereon of a lubricant topcoat layer (corresponding to the layer identified by reference numeral 12 in FIG. 1 and described in detail supra), e.g., deposition of a perfluoropolyether compound by means of dipping or vapor deposition.

In summary, the present invention provides means and methodology for continuous, automated fabrication of high areal density, high performance magnetic recording media, particularly perpendicular magnetic recording media requiring formation of a surface oxide layer on the perpendicular hard magnetic recording layer, at enhanced product throughput rates compatible with the requirements for cost-effective manufacture of such media, while maintaining full compatibility with all aspects of automated manufacturing technology. The present invention advantageously eliminates any need for removal of the media precursors from the manufacturing apparatus for oxide layer formation in the ambient atmosphere and re-installation of the oxidized media in the same or a different manufacturing apparatus for subsequent processing/treatment. Moreover, the shorter duration of the inventive plasma oxidation treatment materially shortens the manufacturing time of the media, vis-á-vis conventional ambient atmosphere processing for oxidation of the surface of the perpendicular magnetic recording layer.

Finally, the inventive oxygen plasma treatment technique can be utilized with any type of magnetic recording media, regardless of the materials used for the substrate, adhesion layer, soft magnetic underlayer(s), interlayer(s), and recording layer(s). As indicated above, the thermal oxidation process parameters and duration are preferably optimized according to the media design and the particular continuous manufacturing apparatus utilized for the treatment to obtain the maximum benefit of the inventive methodology.

In the previous description, numerous specific details are set forth, such as specific materials, structures, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A method of manufacturing magnetic recording media, comprising sequential steps of:
   (a) providing an apparatus for manufacturing magnetic recording media;
   (b) supplying said apparatus with at least one substrate for said media;
   (c) forming a magnetic recording layer on said at least one substrate in a first portion of said apparatus, said magnetic recording layer including a surface;
   (d) treating said surface of said magnetic recording layer with an ionized oxygen-containing plasma in a second portion of said apparatus to form a plasma oxidized surface layer; and
   (e) forming a protective overcoat layer on said plasma oxidized surface layer of said magnetic recording layer in a third portion of said apparatus.

2. The method according to claim 1, wherein:
   step (a) comprises providing a linearly or circularly-configured apparatus including at least said first, second, and third spaced-apart portions.

3. The method according to claim 2, wherein:
   step (a) comprises providing an apparatus adapted for continuous manufacture of a plurality of said media, and including means for transporting said at least one substrate serially through said first, second, and third spaced-apart portions.

4. The method according to claim 3, wherein:
   step (a) comprises providing an apparatus wherein said first, second, and third spaced-apart portions comprise respective first, second, and third spaced-apart chambers.

5. The method according to claim 4, wherein:
   step (a) comprises providing an apparatus wherein said second chamber comprises means for contacting said surface of said magnetic recording layer formed on said at least one substrate in step (c) with said ionized oxygen-containing plasma.

6. The method according to claim 5, wherein:
   step (a) comprises providing an apparatus wherein said second chamber comprises at least one plasma source for generating said ionized oxygen-containing plasma.

7. The method according to claim 6, wherein:
step (a) comprises providing an apparatus wherein said second chamber comprises at least one plasma source selected from the group consisting of: an ion source, a substrate bias voltage source, an inductively coupled RF or DC source, a capacitively coupled RF or DC source, and a radiation source.

8. The method according to claim 4, wherein:
step (a) comprises providing an apparatus wherein said first and third chambers each comprise means for performing therein a thin film deposition process on said at least one substrate.

9. The method according to claim 8, wherein:
step (a) comprises providing an apparatus wherein said first chamber comprises means for performing a sputter deposition process therein.

10. The method according to claim 8, wherein:
step (a) comprises providing an apparatus wherein said third chamber comprises means for performing a sputter deposition process therein.

11. The method according to claim 1, wherein:
step (b) comprises supplying said apparatus with at least one disk-shaped non-magnetic substrate for a hard disk magnetic recording medium.

12. The method according to claim 1, wherein:
step (c) comprises forming a perpendicular magnetic recording layer.

13. The method according to claim 12, wherein:
step (c) comprises forming a Cr-segregated, Cr-rich grain boundary, Co-based alloy perpendicular magnetic recording layer or a granular Co-based alloy perpendicular magnetic recording layer.

14. The method according to claim 13, wherein:
step (c) comprises forming a Cr-segregated, Cr-rich grain boundary, Co-based alloy perpendicular magnetic recording layer comprised of a CoCrPtX alloy, where X=at least one element selected from the group consisting of Ta, B, Mo, V, Nb, W, Zr, Re, Cu, Ag, Hf, Ir, and Y, and wherein Co-containing magnetic grains with hcp lattice structure are segregated by Cr-rich grain boundaries.

15. The method according to claim 13, wherein:
step (c) comprises forming a granular Co-based alloy perpendicular magnetic recording layer comprised of a CoPtX alloy, where X=at least one element or material selected from the group consisting of Cr, Ta, B, Mo, V, Nb, W, Zr, Re, Ru, Cu, Ag, Hf, Ir, Y, $SiO_2$, SiO, $Si_3N_4$, $Al_2O_3$, AlN, TiO, $TiO_2$, $TiO_x$, TiN, TiC, $Ta_2O_3$, NiO, and CoO, and wherein Co-containing magnetic grains with hcp lattice structure are segregated by grain boundaries comprising at least one of oxides, nitrides, and carbides.

16. The method according to claim 1, wherein:
step (d) comprises supplying oxygen ($O_2$) gas to said second portion of said apparatus for forming said ionized oxygen-containing plasma therein.

17. The method according to claim 1, wherein:
step (e) comprises forming a carbon (C)-based protective overcoat on said plasma oxidized surface of said magnetic recording layer.

18. The method according to claim 17, wherein:
step (e) comprises sputter depositing said carbon (C)-based protective overcoat on said plasma oxidized surface layer on said magnetic recording layer.

19. A method of manufacturing magnetic recording media according to a continuous fabrication process, comprising sequential steps of:
(a) providing at least one substrate for said magnetic recording media;
(b) providing an apparatus adapted for continuous manufacturing of said magnetic recording media, comprising at least first, second, and third spaced-apart, serially arranged processing chambers and including means for transporting said at least one substrate serially through at least said first, second, and third spaced-apart processing chambers;
(c) transporting said at least one substrate through said first processing chamber while forming a magnetic recording layer thereon, said magnetic recording layer having a surface;
(d) transporting said at least one substrate with said magnetic recording layer formed thereon to said second processing chamber;
(e) transporting said at least one substrate through said second processing chamber while treating said surface of said magnetic recording layer with an ionized oxygen-containing plasma to form a plasma oxidized surface layer;
(f) transporting said at least one substrate with said plasma oxidized surface layer on said magnetic recording layer to said third processing chamber; and
(g) transporting said at least one substrate with said plasma oxidized surface layer on said magnetic recording layer through said third processing chamber while forming a protective overcoat layer thereon, wherein:
said at least one substrate is transported between and through each of said first, second, and third processing chambers at a substantially constant rate.

20. The method according to claim 19, wherein:
step (a) comprises providing at least one disk-shaped non-magnetic substrate for hard disk recording media;
step (b) comprises providing an apparatus wherein said first and third chambers comprise means for performing a thin film deposition process therein and said second chamber comprises means for contacting said surface of said magnetic recording layer formed in step (c) with an ionized oxygen-containing plasma; and
step (c) comprises forming a Cr-segregated, Cr-rich grain boundary, Co-based alloy perpendicular magnetic recording layer or a granular Co-based alloy perpendicular magnetic recording layer.

* * * * *